(12) United States Patent
Takasu et al.

(10) Patent No.: US 10,622,594 B2
(45) Date of Patent: Apr. 14, 2020

(54) SEALED BATTERY AND MANUFACTURING METHOD THEREOF

(71) Applicant: TOYOTA JIDOSHA KABUSHIKI KAISHA, Toyota-shi, Aichi-ken (JP)

(72) Inventors: Junta Takasu, Komaki (JP); Satoshi Suzuki, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 402 days.

(21) Appl. No.: 15/112,594

(22) PCT Filed: Jan. 21, 2015

(86) PCT No.: PCT/IB2015/000051
§ 371 (c)(1),
(2) Date: Jul. 19, 2016

(87) PCT Pub. No.: WO2015/114435
PCT Pub. Date: Aug. 6, 2015

(65) Prior Publication Data
US 2016/0344000 A1    Nov. 24, 2016

(30) Foreign Application Priority Data
Jan. 30, 2014   (JP) .................. 2014-015624

(51) Int. Cl.
*H01M 2/04* (2006.01)
*H01M 2/36* (2006.01)
*H01M 10/0525* (2010.01)

(52) U.S. Cl.
CPC .......... *H01M 2/0434* (2013.01); *H01M 2/04* (2013.01); *H01M 2/36* (2013.01); *H01M 2/362* (2013.01);
(Continued)

(58) Field of Classification Search
CPC ............... H01M 2/0434; H01M 2/362; H01M 10/0525; H01M 2220/20
See application file for complete search history.

(56) References Cited

U.S. PATENT DOCUMENTS 6,573,000 B1 * 6/2003 Miyazaki ............ H01M 2/0439
429/185
2010/0258538 A1 10/2010 Suzuki et al.
(Continued)

FOREIGN PATENT DOCUMENTS

JP    2009-146645 A    7/2009
JP    2009-259701 A    11/2009
(Continued)

*Primary Examiner* — Osei K Amponsah
(74) *Attorney, Agent, or Firm* — Sughrue Mion, PLLC

(57) ABSTRACT

A sealed battery includes an outer packaging body, a cover, and a welding portion. The outer packaging body has an internal space, and the internal space includes inert gas. The outer packaging body has an opening communicating with the internal space. The cover is configured to close the opening and to seal the internal space. The welding portion is provided on a boundary between the outer packaging body and the cover, and joins the outer packaging body to the cover. The welding portion is provided at a position higher than an uppermost part of the internal space in a state where the opening is opened in a vertically upward direction from the internal space toward an outside of the outer packaging body.

9 Claims, 6 Drawing Sheets

(52) U.S. Cl.
CPC .... *H01M 10/0525* (2013.01); *H01M 2220/20* (2013.01)

(56) References Cited

U.S. PATENT DOCUMENTS

| | | |
|---|---|---|
| 2011/0039154 A1 | 2/2011 | Komatsuki et al. |
| 2012/0019175 A1 | 1/2012 | Suzuki et al. |

FOREIGN PATENT DOCUMENTS

| | | |
|---|---|---|
| JP | 4811540 B2 | 9/2011 |
| JP | 2011-204396 A | 10/2011 |

\* cited by examiner

SEALED BATTERY AND MANUFACTURING METHOD THEREOF

BACKGROUND OF THE INVENTION

1. Field of the Invention

The present invention relates to a sealed battery and a manufacturing method thereof.

2. Description of Related Art

As for a conventional sealed battery, Japanese Patent Application Publication No. 2009-259701 A (JP 2009-259701 A), for example, describes a battery for the purpose of relaxing a stress to act on a joint portion of a sealing cap (JP 2009-259701 A). The battery described in JP 2009-259701 A includes a housing having an injection hole, and a sealing cap configured to close the injection hole. A peripheral part of the sealing cap is joined to the housing by welding; and a central part of the sealing cap bends from the peripheral part to project outside the housing.

In addition to that, Japanese Patent No. 4811540 describes a sealed battery for the purpose of closing a whole circumference of an opening formed in a battery container under a given welding condition (Japanese Patent No. 4811540).

In the battery described in JP 2009-259701 A, the sealing cap configured to close the injection hole is joined, by welding, to the housing having the injection hole. However, at the time of welding the sealing cap, when gas inside the housing is heated by welding heat and expands, the gas breaks into a welding atmosphere. In this case, blowholes may occur due to a welding portion entrapping the gas inside the housing. The blowhole is such a phenomenon that air bubbles occur inside the welding portion.

SUMMARY OF THE INVENTION

The present invention provides a sealed battery that restrains occurrence of blowholes in a welding portion, and a manufacturing method thereof.

A sealed battery according to the present invention includes: an outer packaging body having an internal space, the internal space including inert gas, the outer packaging body having an opening communicating with the internal space; a cover configured to close the opening and to seal the internal space; and a welding portion provided on a boundary between the outer packaging body and the cover, the welding portion being configured to join the outer packaging body to the cover, the welding portion being provided at a position higher than an uppermost part of the internal space in a state where the opening is opened in a vertically upward direction from the internal space toward an outside of the outer packaging body.

According to the sealed battery configured as such, the inert gas is retained in the uppermost part of the internal space at the time of welding of the outer packaging body and the cover, thereby making it possible to prevent such a phenomenon that gas inside the outer packaging body is entrapped into the welding portion. Hereby, it is possible to restrain occurrence of blowholes in the welding portion.

The cover may be provided at a position at which the cover is adjacent to the welding portion, and the cover may have a projection portion projecting from the outside toward the internal space.

According to the sealed battery configured as such, it is possible to promote the inert gas to be retained in the uppermost part of the internal space at the time of welding of the outer packaging body and the cover.

A lowest part of the welding portion may be provided at a position higher than the uppermost part of the internal space. According to the sealed battery configured as such, the inert gas is retained at a position lower than the lowest part of the welding portion, thereby making it possible to prevent such a phenomenon that gas inside the outer packaging body is entrapped into the welding portion.

The outer packaging body may have a top surface, and the cover may be provided at a position lower than the top surface.

According to the sealed battery configured as such, when shielding gas is supplied to the welding portion in an external space at the time of welding of the outer packaging body and the cover, it is possible to prevent the flow of the shielding gas from being disturbed by the cover. Hereby, it is possible to effectively restrain occurrence of blowholes in the welding portion.

A sealed battery manufacturing method according to the present invention includes: injecting an electrolyte into an outer packaging body through an opening and supplying inert gas into the outer packaging body; forming a sealed internal space inside the outer packaging body by covering the opening with a cover, after supplying the inert gas into the outer packaging body; and joining, by welding, a contacting face between the outer packaging body and the cover in a state where the opening is opened in a vertically upward direction from the internal space toward an outside of the outer packaging body, the contacting face being provided at a position higher than an uppermost part of the internal space.

According to the sealed battery manufacturing method configured as such, the inert gas is retained in the uppermost part of the internal space at the time of welding of the outer packaging body and the cover, thereby making it possible to prevent such a phenomenon that gas inside the outer packaging body is entrapped at a welding position. Hereby, it is possible to restrain occurrence of blowholes in the welding portion between the outer packaging body and the cover.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
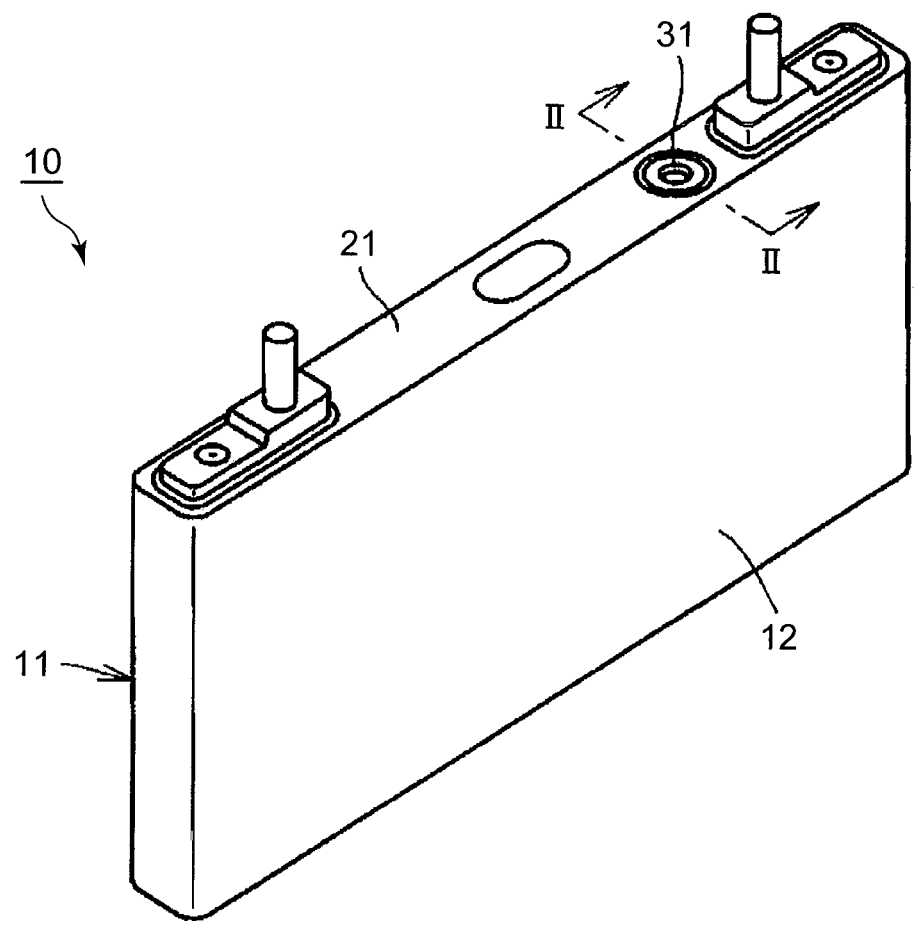
FIG. 1 is a perspective view illustrating a sealed battery in Embodiment 1 of the present invention.

Embodiments of the present invention will be described below with reference to the drawings. Note that, in the drawings to be referred to in the following description, the same reference sign is assigned to the same or equivalent member.

Figure 2:
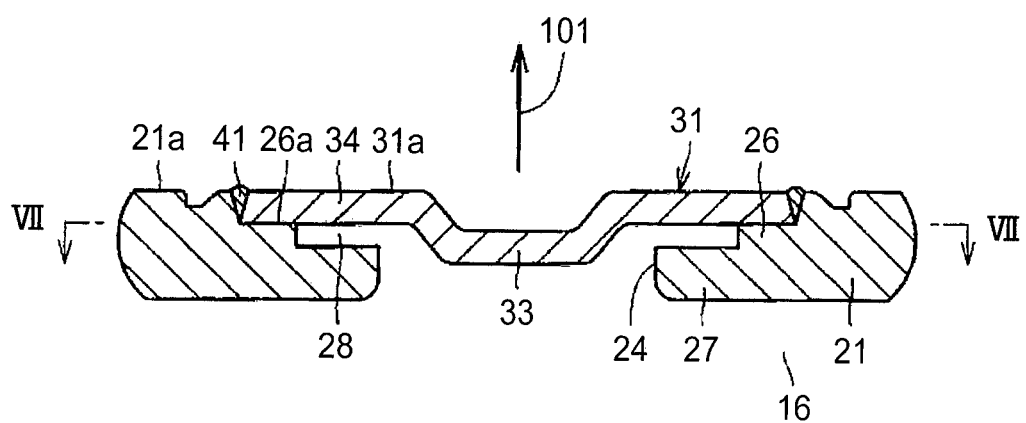
FIG. 2 is a sectional view illustrating the sealed battery taken along a line II-II in FIG. 1.

FIG. 1 is a perspective view illustrating a sealed battery in Embodiment 1 of the present invention. FIG. 2 is a sectional view illustrating the sealed battery taken along a line II-II in FIG. 1.

Referring now to FIGS. 1 and 2, the sealed battery 10 in the present embodiment is used for a battery pack obtained by combining a plurality of sealed batteries 10 in series, and provided in a hybrid vehicle. The battery pack is a power source for the hybrid vehicle, as well as an internal combustion engine such as a gasoline engine or a diesel engine. A typical example of the sealed battery 10 is a lithium ion secondary battery.

The sealed battery 10 includes a battery constituent (not shown) and an outer packaging body 11. The battery constituent is constituted by laminating positive and negative electrode plates via a separator. The outer packaging body 11 has a housing shape, and the battery constituent and an electrolyte are accommodated in an internal space 16 formed inside the outer packaging body 11.

The outer packaging body 11 is constituted by combining a case 12 and a cover 21 with each other. The case 12 has an appearance of a generally rectangular solid shape as a whole, and one surface thereof is opened. The cover 21 has a flat shape having a rectangular plan view, and is provided so as to close the opening of the case 12. The cover 21 has a top face 21a. The top face 21a faces an external space outside the outer packaging body 11.

The case 12 and the cover 21 are made of metal. The case 12 and the cover 21 are made of aluminum, for example. The case 12 and the cover 21 are joined to each other by welding.

A predetermined amount of inert gas is enclosed in the internal space 16 of the outer packaging body 11. The inert gas has a specific gravity smaller than a main gas component (air as a representative example) in the internal space 16. A type of the inert gas is not limited particularly, and helium (He) is used, for example.

An injection hole 24 is formed in the outer packaging body 11. The injection hole 24 is formed so as to communicate with the internal space 16 from the outside of the outer packaging body 11. The injection hole 24 is formed so as to penetrate through the cover 21. The injection hole 24 is formed as an opening through which the electrolyte is injected into the internal space 16 from the outside of the outer packaging body 11.

In FIG. 2, the outer packaging body 11 is illustrated in a state where the injection hole 24 is opened in a vertically upward direction (a direction indicated by an arrow 101) toward the outside of the outer packaging body 11 from the internal space 16.

The cover 21 includes a stepped portion 26 and a stepped portion 27. When an opening surface of the injection hole 24 is viewed from the front, the stepped portion 27 is provided on an outer circumference of the injection hole 24, and the stepped portion 26 is provided on an outer circumference of the stepped portion 27. The stepped portion 26 is provided at a position recessed from the top face 21a toward the internal space 16, and the stepped portion 27 is provided at a position further recessed toward the internal space 16 from the stepped portion 26. The opening surface of the injection hole 24 is defined by an inner circumferential edge of the stepped portion 27. The stepped portion 26 is provided in an annular manner. A plan view of the stepped portion 26 is not limited in particular. However, in the present embodiment, the stepped portion 26 has a circular outer shape when the opening surface of the injection hole 24 is viewed from the front.

The sealed battery 10 further includes a sealing stopper (cap) 31 and a welding portion 41. The sealing stopper 31 is provided so as to close the injection hole 24. The internal space 16 is an enclosed space by the sealing stopper 31. The sealing stopper 31 is made of metal. The sealing stopper 31 is made of aluminum, for example. The outer packaging body 11 (the cover 21) and the sealing stopper 31 are joined to each other by the welding portion 41.

The sealing stopper 31 is placed on the stepped portion 26. In the present embodiment, the sealing stopper 31 is provided so as not to project from the top face 21a of the cover 21. The sealing stopper 31 has a top face 31a. The top face 31a faces an external space outside the outer packaging body 11. The sealing stopper 31 is provided so that the top face 31a is flush with the top face 21a of the cover 21.

The sealing stopper 31 has a flat shape as a whole. The sealing stopper 31 has a plan view corresponding to the outer shape of the stepped portion 26, and in the present embodiment, the sealing stopper 31 has a circular plan view. The sealing stopper 31 includes a projection portion 33 and a flat portion 34 as constituents thereof.

The projection portion 33 is provided in a central part of the sealing stopper 31 having a circular plan view. The projection portion 33 is provided so as to project toward the internal space 16 from the outside of the outer packaging body 11. When the opening surface of the injection hole 24 is viewed from the front, the projection portion 33 is provided at a position where the projection portion 33 is projected onto the opening surface of the injection hole 24. The projection portion 33 is provided adjacent to the welding portion 41 described later. The projection portion 33 is provided inside the welding portion 41 provided in an annular manner. The flat portion 34 is provided on an outer circumference of the projection portion 33. The flat portion 34 extends in a flat shape in a direction parallel to the top face 21a of the cover 21. When the opening surface of the injection hole 24 is viewed from the front, the flat portion 34 is provided at a position where the flat portion 34 is projected onto the stepped portion 26 and the stepped portion 27.

The flat portion 34 is superimposed on the stepped portion 26. An inert gas retaining portion 28 is formed as a space between the flat portion 34 and the stepped portion 27. The projection portion 33 is positioned inside the inert gas retaining portion 28. In a state where the injection hole 24 is opened in the vertically upward direction toward the outside of the outer packaging body 11 from the internal space 16 as illustrated in FIG. 2, the inert gas retaining portion 28 is placed in an uppermost part of the internal space 16.

The welding portion 41 is a welding trace formed by performing welding on a contacting face between the outer packaging body 11 and the sealing stopper 31. The welding portion 41 is provided in a boundary between the outer packaging body 11 (the cover 21) and the sealing stopper 31. The welding portion 41 is provided on an outer circumference of the sealing stopper 31 having a circular plan view.

The welding portion 41 is provided in an annular manner around an outer circumferential edge of the flat portion 34. The welding portion 41 is provided with a predetermined depth in a thickness direction of the sealing stopper 31 from the top face 21a and the top face 31a.

The welding portion 41 is provided at a position higher than the uppermost part of the internal space 16. The welding portion 41 is provided at a position higher than the inert gas retaining portion 28. Particularly in the present embodiment, a lowest part of the welding portion 41 is provided at a position higher than the uppermost part of the internal space 16. The uppermost part of the internal space 16 is connected to the lowest part of the welding portion 41.

Note that, in the present invention, the whole welding portion 41 may not be provided at a position higher than the uppermost part of the internal space 16. For example, even such an embodiment that the welding portion 41 is formed to a position deeper than that mounting surface 26a of the stepped portion 26 on which the sealing stopper 31 is mounted is also included in the present invention.

Figure 3:
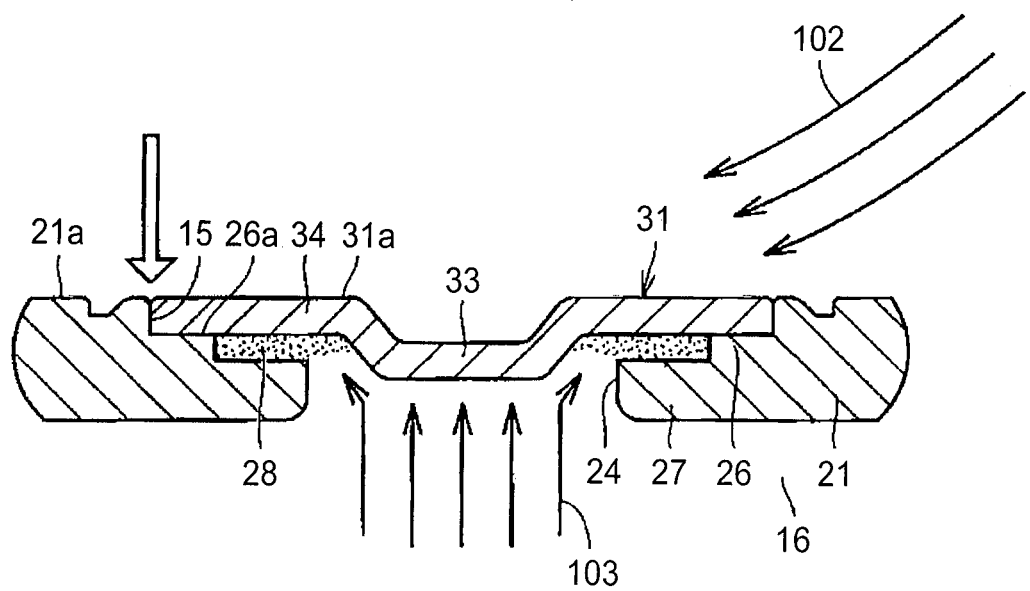
FIG. 3 is a sectional view illustrating a step of a manufacturing method of the sealed battery in FIG. 2.

Next will be described a manufacturing method of the sealed battery 10 according to the present embodiment. FIG. 3 is a sectional view illustrating a step of a manufacturing method of the sealed battery in FIG. 2.

Referring now to FIGS. 1 to 3, the battery constituent (not shown) is accommodated in the case 12. The cover 21 is provided so as to close the opening of the case 12, and the case 12 is joined to the cover 21 by welding. Then, through the injection hole 24, an electrolyte is injected into the outer packaging body 11 and inert gas is supplied to the internal space 16.

Referring now to FIG. 3, the sealing stopper 31 is provided so as to close the injection hole 24, thereby sealing the internal space 16. At this time, a contacting face 15 between the outer packaging body 11 and the sealing stopper 31 is formed by the outer circumferential edge of the flat portion 34 of the sealing stopper 31 and that inner circumferential surface of the outer packaging body 11 (the cover 21) which faces the outer circumferential edge.

Then, in a state where the injection hole 24 is opened in the vertically upward direction from the internal space 16 toward its outside as illustrated in FIG. 3, that contacting face 15 between the outer packaging body 11 and the sealing stopper 31 which is provided at a position higher than the uppermost part of the internal space 16 is joined by welding. In the present embodiment, the welding is performed by radiating laser toward the contacting face 15 between the outer packaging body 11 and the sealing stopper 31 as indicated by a blank arrow in the figure.

In this welding process, shielding gas is supplied toward a welding area as indicated by an arrow 102 outside the outer packaging body 11. Inert gas such as argon (Ar) or nitrogen ($N_2$) is used as the shielding gas, for example. Gas mainly containing such inert gas and further containing second gas (carbon dioxide, oxygen, or hydrogen) may be used as the shielding gas.

The shielding gas covers arc and molten metal at the time of the welding, and prevents air from coming inside a welding atmosphere. In the present embodiment, the sealing stopper 31 is provided so as not to project from the top face 21a of the cover 21, so the shielding gas can be smoothly supplied toward the welding area.

By the above steps, the sealed battery 10 in which the contacting face 15 between the outer packaging body 11 and the sealing stopper 31 is sealed by the welding portion 41 illustrated in FIG. 2 is obtained.

Next will be described an effect obtained by the sealed battery 10 and its manufacturing method according to the present embodiment, with reference to a comparative example.

Figure 4:
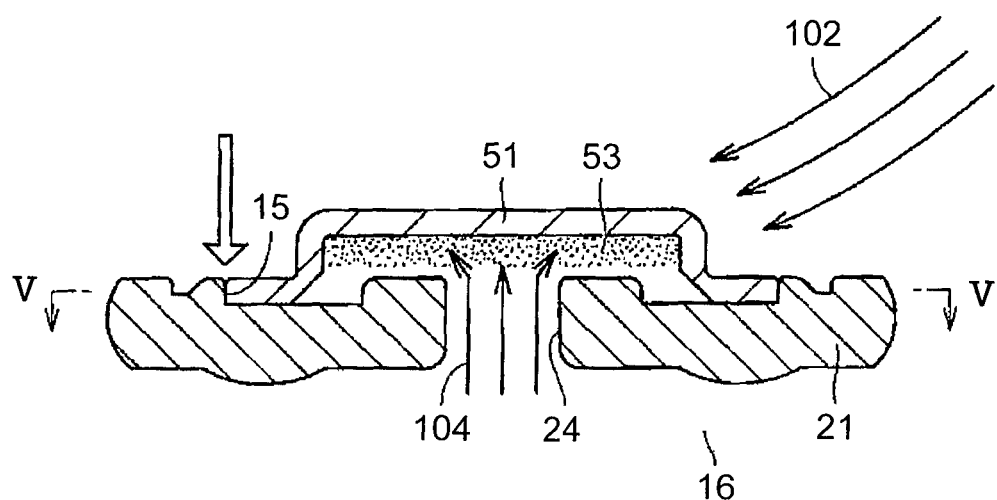
FIG. 4 is a sectional view illustrating a step of a manufacturing method of a sealed battery for comparison.

FIG. 4 is a sectional view illustrating a step of a manufacturing method of a sealed battery for comparison. FIG. 4 is a figure corresponding to FIG. 3. Referring now to FIG. 4, the sealed battery for comparison has a sealing stopper 51 instead of the sealing stopper 31 in FIG. 3. The sealing stopper 51 has a shape projecting from an internal space 16 toward an outside of an outer packaging body 11, and an inert gas retaining portion 53 as an uppermost part of the internal space 16 is formed thereinside. With such a configuration, in the sealed battery for comparison, that contacting face 15 (welding portion 41) between the outer packaging body 11 and the sealing stopper 51 is provided at a position lower than the uppermost part of the internal space 16.

The welding portion 41 that seals the contacting face 15 between the outer packaging body 11 and the sealing stopper 51 is demanded to have two functions of airtightness and compressive strength. At the time of welding by laser irradiation, shielding gas is flowed toward a welding area so as to restrain occurrence of blowholes in the welding portion 41, in general. However, the shielding gas cannot be flowed into the internal space 16 inside the outer packaging body 11. Because of this, air in the outer packaging body 11 is heated to expand and cannot escape from the outer packaging body 11, thereby resulting in that blowholes are easy to occur.

As an approach to restrain the occurrence of blowholes, there is such a method in which inert gas is provided within the outer packaging body 11. In the sealed battery for comparison as illustrated in FIG. 4, as indicated by an arrow 104, the inert gas having a small specific gravity is retained in the inert gas retaining portion 53 placed at the uppermost part of the internal space 16 in the outer packaging body 11. However, since the contacting face 15 between the outer packaging body 11 and the sealing stopper 51 is placed at the position lower than the uppermost part of the internal space 16, it is difficult to shield, by the inert gas, a welding area from the air inside the outer packaging body 11.

Figure 5:
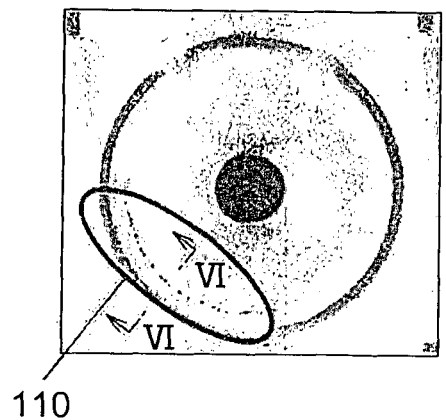
FIG. 5 is a sectional view illustrating a welding portion in the sealed battery for comparison in FIG. 4.
Figure 6:
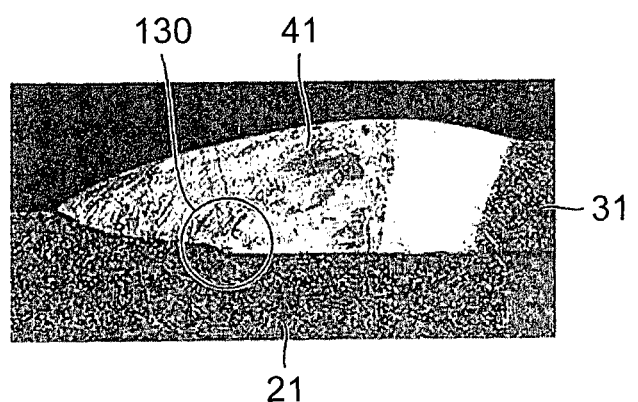
FIG. 6 is a sectional view illustrating the welding portion taken along a line VI-VI in FIG. 5.

FIG. 5 is a sectional view illustrating the welding portion in the sealed battery for comparison in FIG. 4. FIG. 5 illustrates a section of the welding portion 41 corresponding to a position along a line V-V in FIG. 4. FIG. 6 is a sectional view illustrating the welding portion along a line VI-VI in FIG. 5. In these figures, a section of the welding portion taken by use of CT (Computed Tomography) is illustrated.

Referring to FIGS. 5 and 6, in the sealed battery for comparison, blowholes continuously aligned in a circumferential direction are observed in the welding portion 41 as indicated by a leading line 110 in FIG. 5 and a leading line 130 in FIG. 6.

In contrast, as illustrated in FIG. 3, in the sealed battery 10 according to the present embodiment, the contacting face 15 between the outer packaging body 11 and the sealing stopper 31 is provided at the position higher than the uppermost part of the internal space 16 at the time of welding. With such a configuration, the inert gas is retained in the inert gas retaining portion 28 placed at the uppermost part of the internal space 16, thereby making it possible to cover the welding area with the inert gas, as indicated by an arrow 103. As a result, it is possible to prevent the air in the outer packaging body 11 from being entrapped in the welding area, and it is possible to restrain the occurrence of blowholes in the welding portion 41.

Further, in the present embodiment, the sealing stopper 31 includes the projection portion 33 projecting toward the internal space 16 from the outside of the outer packaging body 11. With such a configuration, the inert gas is easily retained in the inert gas retaining portion 28, thereby making it possible to further effectively restrain the occurrence of blowholes.

Figure 7:
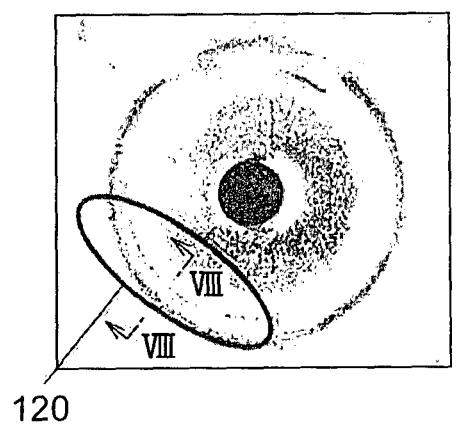
FIG. 7 is a sectional view illustrating a welding portion taken along a line VII-VII in the sealed battery in FIG. 2.
Figure 8:
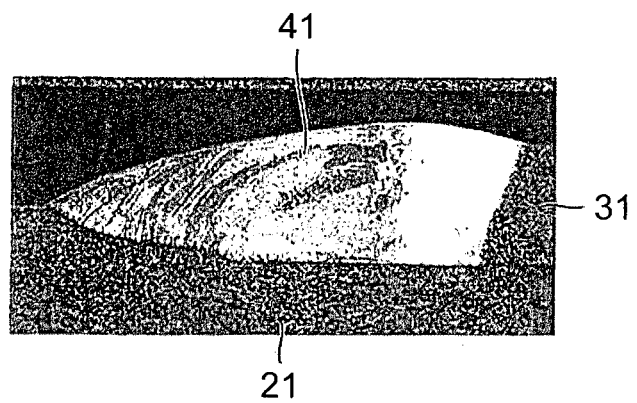
FIG. 8 is a sectional view illustrating the welding portion taken along a line VIII-VIII in FIG. 7.

FIG. 7 is a sectional view illustrating the welding portion along a line VII-VII in the sealed battery in FIG. 2. FIG. 8 is a sectional view illustrating the welding portion along a line VIII-VIII in FIG. 7. In these figures, a section of the welding portion taken by use of CT is illustrated.

Referring now to FIGS. 7 and 8, in the sealed battery 10 according to the present embodiment, as indicated by a leading line 120 in FIG. 7, blowholes are largely reduced in comparison with the comparative example in FIGS. 5 and 6.

The following collectively describes the configurations of the sealed battery 10 and its manufacturing method in Embodiment 1 of the present invention described above. The sealed battery 10 according to the present embodiment includes: the outer packaging body 11 forming the internal space 16 including inert gas therein and having the injection hole 24 as an opening communicating with the internal space 16; the sealing stopper 31 serving as a cover configured to close the injection hole 24 and to seal the internal space 16; and the welding portion 41 provided in a boundary between the outer packaging body 11 and the sealing stopper 31 and configured to join the outer packaging body 11 to the sealing stopper 31. In a state where the injection hole 24 is opened in the vertically upward direction from the internal space 16 toward its outside, the welding portion 41 is provided at a position higher than the uppermost part of the internal space 16.

Further, the manufacturing method of the sealed battery 10 according to the present embodiment includes: a step of injecting an electrolyte into the outer packaging body 11 through the injection hole 24 as an opening and supplying inert gas into the outer packaging body 11; a step of forming the sealed internal space 16 inside the outer packaging body 11 by closing the injection hole 24 by the sealing stopper 31 as a cover after the step of supplying the inert gas; and a step of joining, by welding, that contacting face 15 between the outer packaging body 11 and the sealing stopper 31 which is provided at a position higher than the uppermost part of the internal space 16, in a state where the injection hole 24 is opened in the vertically upward direction from the internal space 16 toward its outside.

According to the sealed battery 10 and its manufacturing method in Embodiment 1 of the present invention configured as such, it is possible to prevent air in the outer packaging body 11 from being entrapped in a welding area at the time of welding the outer packaging body 11 and the sealing stopper 31, thereby making it possible to restrain the occurrence of blowholes in the welding portion 41. Hereby, airtightness and compressive strength of the outer packaging body 11 can be improved.

Note that the sealed battery 10 according to the present embodiment can be provided not only in a hybrid vehicle, but also in an electric vehicle (EV), for example.

Embodiment 2 deals with a modification of the sealed battery 10 and its manufacturing method described in Embodiment 1.

Figure 9:
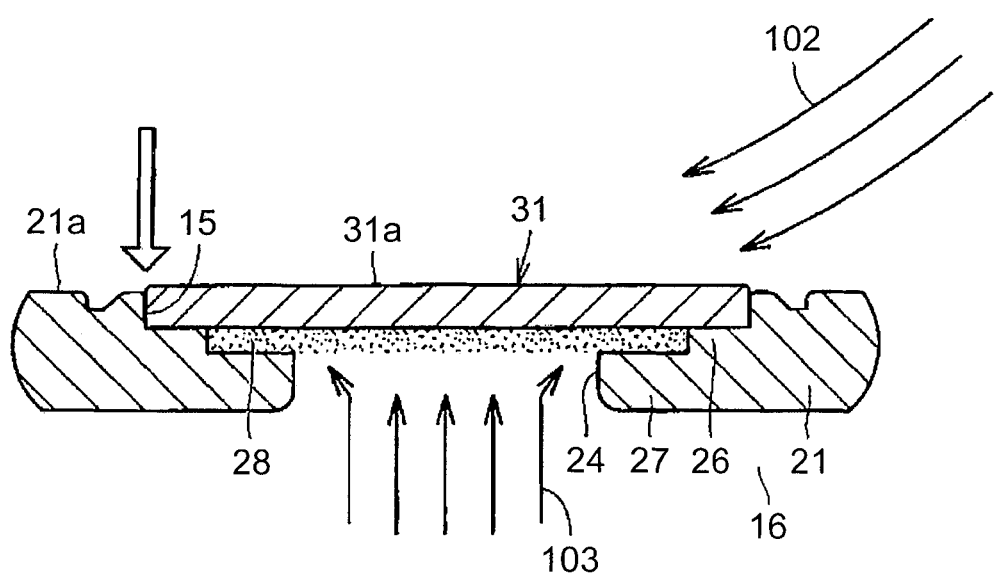
FIG. 9 is a sectional view illustrating a first modification of the steps of the manufacturing method of the sealed battery in FIG. 3.
Figure 10:
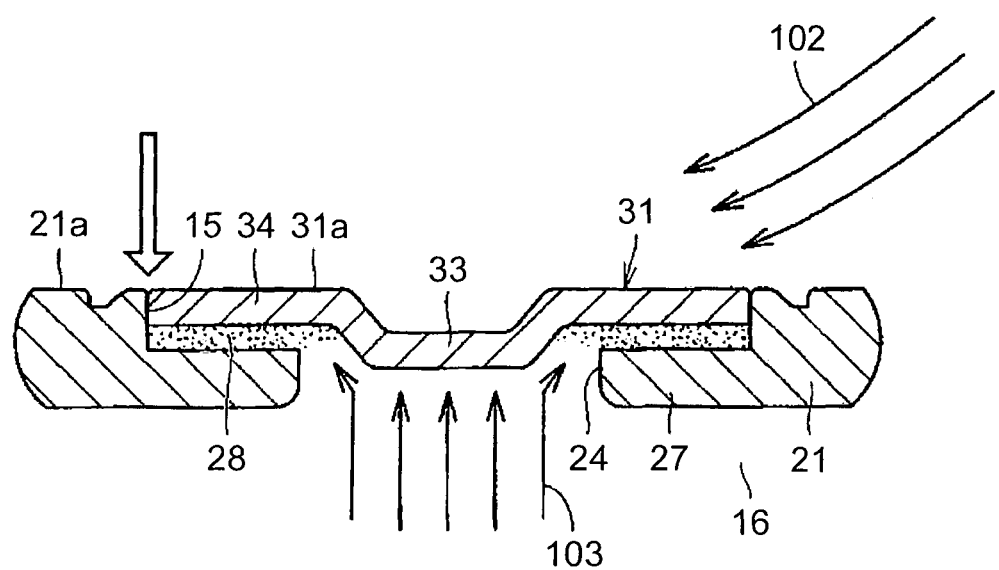
FIG. 10 is a sectional view illustrating a second modification of the steps of the manufacturing method of the sealed battery in FIG. 3.

FIG. 9 is a sectional view illustrating a first modification of the step of the manufacturing method of the sealed battery in FIG. 3. FIG. 10 is a sectional view illustrating a second modification of the step of the manufacturing method of the sealed battery in FIG. 3.

Referring now to FIG. 9, in this modification, a whole sealing stopper 31 has a flat shape. Even with such a configuration, it is possible to retain inert gas in a space right below the sealing stopper 31 and to prevent air in an outer packaging body 11 from being entrapped in a welding area, at the time of welding the outer packaging body 11 and the sealing stopper 31.

Referring now to FIG. 10, in this modification, a stepped portion 26 like the one in FIG. 2 is provided intermittently in a circumferential direction (FIG. 10 illustrates a section where the stepped portion 26 is intermittent). If the stepped portion 26 is provided at least two places in the circumferential direction, a sealing stopper 31 functions as a base on which the sealing stopper 31 is placed. In such a configuration, at a position where the stepped portion 26 is not provided, an inert gas retaining portion 28 is directly connected to a lowest part of a welding portion 41.

According to the sealed battery and its manufacturing method in Embodiment 2 of the present invention configured as such, it is also possible to yield the effect as described in Embodiment 1.

It should be considered that the embodiments described herein are just examples in all respects and are not limitative. A scope of the present invention is shown by Claims, not by the descriptions, and intended to include all modifications made within the meaning and scope equivalent to Claims.

The present invention is applied to a sealed battery such as a lithium ion secondary battery.

The invention claimed is:

1. A sealed battery comprising:
    an outer packaging body having an internal space, the internal space including inert gas, the outer packaging body having an opening communicating with the internal space, wherein the outer packaging body includes a case and a cover;
    a sealing stopper configured to close the opening and to seal the internal space, wherein the sealing stopper includes a projection portion projecting in a direction from an outside of the outer packaging body toward the internal space; and
    a welding portion provided on a boundary between the outer packaging body and the sealing stopper, the welding portion being configured to join the outer packaging body to the sealing stopper, the welding portion being provided at a position higher than an uppermost part of the internal space in a state where the opening is opened in a vertically upward direction from the internal space toward the outside of the outer packaging body,
    wherein the sealing stopper has a flat portion surrounding the projection portion in planar view of the sealing stopper, the outer packaging body has a mounting surface around the opening, and the mounting surface contacts a lower surface of the flat portion in the state where the opening is opened in the vertically upward direction from the internal space toward the outside of the outer packaging body.

2. The sealed battery according to claim 1, wherein the projection portion is adjacent to the welding portion.

3. The sealed battery according to claim 1, wherein a lowest part of the welding portion is provided at a position higher than the uppermost part of the internal space.

4. The sealed battery according to claim 1, wherein the outer packaging body has a top surface, and the sealing stopper is provided at a position lower than the top surface.

5. A sealed battery manufacturing method comprising:
injecting an electrolyte into an outer packaging body through an opening and supplying inert gas into the outer packaging body, wherein the outer packaging body includes a case and a cover;
forming a sealed internal space inside the outer packaging body by covering the opening with a sealing stopper, after supplying the inert gas into the outer packaging body, wherein the sealing stopper includes a projection portion projecting in a direction from an outside of the outer packaging body toward the internal space; and
joining, by welding, a contacting face between the outer packaging body and the sealing stopper in a state where the opening is opened in a vertically upward direction from the internal space toward the outside of the outer packaging body, the contacting face being provided at a position higher than an uppermost part of the internal space,
wherein
the sealing stopper has a flat portion surrounding the projection portion in planar view of the sealing stopper, the outer packaging body has a mounting surface around the opening, and the mounting surface contacts a lower surface of the flat portion in the state where the opening is opened in the vertically upward direction from the internal space toward the outside of the outer packaging body.

6. The sealed battery according to claim 1, wherein the projecting portion is projected further inward to the internal space than the flat portion.

7. The sealed battery manufacturing method according to claim 5, wherein the projecting portion is projected further inward to the internal space than the flat portion.

8. The sealed battery according to claim 1, wherein the sealing stopper includes:
   a top face that faces the outside of the outer package body,
   a bottom face that is opposite to the top face, and
   the projection portion projects from the bottom face so as to be located further inward to the internal space than remaining portions of the bottom face.

9. The sealed battery manufacturing method according to claim 5, wherein the sealing stopper includes:
   a top face that faces the outside of the outer package body,
   a bottom face that is opposite to the top face, and
   the projection portion projects from the bottom face so as to be located further inward to the internal space than remaining portions of the bottom face.

* * * * *